United States Patent [19]
Takayama et al.

[11] Patent Number: 5,640,619
[45] Date of Patent: Jun. 17, 1997

[54] MULTIPLE POINT FOCUS DETECTION CAMERA

[75] Inventors: Toru Takayama, Kanagawa-ken; Tsutomu Narisawa, Saitama-ken; Hitoshi Imanari, Kanagawa-ken, all of Japan

[73] Assignee: Nikon Corporation, Tokyo, Japan

[21] Appl. No.: 325,579

[22] Filed: Oct. 19, 1994

[30] Foreign Application Priority Data

Dec. 14, 1993 [JP] Japan .................................. 5-313681
Dec. 15, 1993 [JP] Japan .................................. 5-315103

[51] Int. Cl.$^6$ .................................................. G03B 7/08
[52] U.S. Cl. ...................... 396/137; 396/89; 396/121; 396/297; 396/529
[58] Field of Search ........................... 354/400, 402, 354/442, 443, 286; 396/89, 90, 92, 121, 137, 297, 529

[56] References Cited

U.S. PATENT DOCUMENTS

| | | | |
|---|---|---|---|
| 4,671,640 | 6/1987 | Akada et al. | 354/402 |
| 4,985,723 | 1/1991 | Egawa et al. | 354/400 |
| 5,255,043 | 10/1993 | Kawasaki | 354/402 |
| 5,363,169 | 11/1994 | Ishida et al. | 354/442 |

*Primary Examiner*—Daniel P. Malley
*Attorney, Agent, or Firm*—Oliff & Berridge

[57] ABSTRACT

A multiple point focus detection camera capable of acquiring focus detection data on objects within a photographer's field of vision is operable in an automatic or a manual mode, and can be automatically switched to the automatic or manual modes as a default upon the occurrence of certain events in order to reduce the likelihood of errors during photography. Automatic operation can be enabled (i.e., is the default) upon power-up or changing of lenses. Manual operation can be enabled when lens data indicates that a lens used most often by a professional photographer is in use. Either mode (automatic or manual) can be set as a default mode, which can be selected when the camera is placed in a self timer mode. A default mode change feature can be provided to allow a user to select automatic or manual as the default mode.

35 Claims, 14 Drawing Sheets

MULTIPLE POINT FOCUS DETECTION CAMERA

BACKGROUND OF THE INVENTION

1. Field of the Invention

The present invention relates to multiple point focus detection cameras that perform the action of focussing based on focus detection data measured in selected focus detection areas from among a plurality of available focus detection areas.

2. Description of Related Art

Under the prior art, in a camera equipped with a focus detection device, as shown in FIG. 10, a focus detection area 8 has been provided in the center of the field of vision 9 of the viewfinder. Focus detection is performed in the focus detection area 8, and the lens is moved so as to focus the lens on the subject in the focus detection area 8.

However, in cases where the focus detection area 8 is in the center of the field of vision 9 of the viewfinder, such as is shown in FIG. 10, but the primary subject that the photographer wants to photograph is not in the center of the field of vision 9 of the viewfinder, a photograph is taken with the camera focussed on something other than the primary subject.

As shown in FIG. 11, a camera has also been proposed that has a structure such that a plurality of focus detection areas 8 are provided in the field of vision 9 of the viewfinder, from among which a specific area is selected, the lens being focussed according to the subject in the area selected. Two methods are known for deciding in the camera which area is to be selected from among the plurality of focus detection areas 8. First, there is a method wherein the selection of one of the focus detection areas from among the plurality of focus detection areas 8 is received from the photographer, focus detection being performed on the focus detection area received, and the lens being focussed on the subject in the area. There is another method wherein focus detection is performed in all of the multiple point focus detection areas 8, the area containing the primary subject being automatically selected through computations based on the processing of the obtained focus detection data under predetermined or user-selected criteria, and the lens being focussed on the subject in the selected area. In this instance, the criteria used to automatically determine the focus detection area could be, for instance, the selection of the focus detection area having the shortest distance from the camera. Conventionally, the former of these two methods is called the manual mode and the latter is called the automatic mode. A camera has been known which is equipped with both methods so that either can be used at the discretion of the photographer.

The manual mode described above emphasizes the composition of the photographer and has the advantage of allowing photographs to be taken according to the will of the photographer. However, because the camera focusses on an area that has already been set, there is the fear that a photograph could be taken that is not focussed on the primary subject if the photographer were to forget that the camera is set in the manual mode.

On the other hand, with the automatic mode, there is the fear that when a special composition is desired, the camera could focus on something other than what the photographer desires to be the primary subject.

In addition, because photography involving the use of a self timer is frequently used, especially for commemorative photographs that cannot be retaken later, it is desirable to take photographs after making certain of the subject being focused upon. However, in most cases involving the average photographer, and normally for professionals and advanced amateurs, a photograph focussed on the primary subject can be taken in the automatic mode without error. Accordingly, in considering the case where a multiple point focus detection camera is used by a novice, the manual mode would hardly ever be used; accordingly the automatic mode can be assumed to be more frequently used for photography.

In addition, when the same camera is used by a number of different individuals, there would be the concern that if the prior user were to leave the camera in the manual mode and a photograph were taken without noticing this setting, a picture could result that is not focussed on the primary subject. In that case, because the user usually realizes that the photograph was taken using the manual mode only after the prints have been made, there are many cases where the photograph cannot be retaken. In order to prevent this kind of error, it is necessary to verify the mode that was set previously each time a photograph is taken. It is desirous to eliminate this necessity.

SUMMARY OF THE INVENTION

It is an object of embodiments of the present invention to provide a multiple point focus detection camera in which the focus detection area can be selected either automatically or manually and that is easy to use and results in few errors in picture taking.

A first embodiment of a multiple point focus detection camera according to the present invention selects the automatic mode when a power switch is depressed and a power source of the camera is engaged. Accordingly, when the power switch is depressed, a controller of the camera, such as, for example, a programmed computer, selects a default mode from among the manual and automatic focus detection modes, in this case, the default mode being the automatic mode.

A second embodiment of a multiple point focus detection camera according to the present invention includes a lens mounting detection sensor that detects when a lens has been switched. This second embodiment is similar to the first embodiment except that the controller selects the default mode (in this case the automatic focus detection mode) when the lens mounting detection sensor indicates that the camera lens has been switched rather than when the power switch is depressed.

With such embodiments, because the automatic mode is assuredly set regardless of whether the manual mode or the automatic mode was previously used for picture taking or was previously used prior to switching the lens, it is unnecessary to verify prior to subsequent picture taking whether the camera is set to the automatic or manual mode. Thus, even when the camera had been set to the manual mode during its previous use or prior to switching the lens, and this has been forgotten, the automatic mode is set. As a result, except for cases in which a special composition is desired, concerns that a photograph might be taken that is not focussed on the primary subject are sharply reduced. Accordingly, ease of use of a multiple point focus detection camera can be improved. Such ease of use becomes particularly important when the photographer is a novice or when a plurality of people use a single camera. In addition, even when professionals or advanced amateurs take photographs having a special composition, because it is understood that the automatic mode is set when the power source is engaged or the lens is changed, it is not necessary to verify whether the automatic mode or the manual mode was set for the previous photograph. Ease of use is improved because even in this situation, merely switching to the manual mode is all that is required when the manual mode is desired.

A third embodiment of a multiple point focus detection camera according to the present invention includes a lens data reading device that reads lens data from a mounted lens (i.e., a lens mounted on the camera). The camera controller determines whether to set the automatic mode based on whether the lens data that is read includes specific predetermined data.

Because professionals and advanced amateurs want to take photographs having a special composition, they use the manual mode more frequently than do general photographers. In this embodiment, when the lens data contains certain data, the camera controller recognizes that the photographer is a professional or an advanced amateur and does not forcibly set the automatic mode. Certain data contained in the lens data can be used to indicate the use of a lens employed frequently by professionals and advanced amateurs but hardly ever utilized by general photographers. For instance, when the lens has a longer focal length than a preset value, a brighter F-value than a preset value, or has a depth of field shallower than a preset value, the controller will not forcibly set the automatic mode because use of these lenses by professionals and advanced amateurs is frequent. However, with all other lenses, such a camera would operate to forcibly set the automatic mode. In addition, certain data indicating a high frequency of use by professionals and advanced amateurs could be stored in the lens data of lenses having, for example, a long focal length, a bright F-value or a shallow depth of field, and the controller could detect whether the data was included in the lens data, and when the data was not included, the automatic mode would be set.

It is another object of embodiments of the present invention to provide a multiple point focus detection camera that performs focus detection in a plurality of focus detection areas, and in which there is little possibility of a mistake occurring when taking photographs using a self timer.

In this embodiment of the multiple point focus detection camera, the camera controller sets the camera to whichever mode (i.e. manual or automatic) corresponds to a default mode, regardless of the mode that was selected previously, when the command for photography using the self timer is received. For instance, when the manual mode has been set as the default mode, the manual mode is selected when photography using the self timer is undertaken. The controller then receives from the photographer the selection of a specific area from among the plurality of focus detection areas, and computes the necessary amount of lens movement in order to focus the lens using the focus detection data from this specific area. On the other hand, when the automatic mode has been set as the default mode, the automatic mode is selected when photography using the self timer is undertaken. The controller determines the specific area using focus data detected by the focus detection device, and computes the necessary amount of lens movement in order to focus the lens using the focus detection data from the specific area determined in the automatic mode.

It is possible to preselect whether the automatic mode or the manual mode will be used for focussing during photography using the self timer. For example, either the automatic mode or the manual mode is fixed as the default mode beforehand, i.e., by the manufacturer. Alternatively, the camera can be provided with a selection device so that either mode can be selected beforehand as the default mode at the will of the photographer.

When the selection of the manual mode is made for photography using the self timer, because the area containing what the photographer recognizes as the primary subject is manually selected, it is possible to focus with certainty on this area, and consequently, it becomes possible to take photographs with certainty even for photography where the photograph cannot be retaken later, such as in commemorative photographs and the like. In addition, because the manual mode is assuredly set by directing the use of the self timer, even when photography is performed using the automatic mode immediately prior to photography using the self timer, there is no need ho switch modes. This eliminates the requirement of switching modes and boosts operability, while also making it possible to reliably take photographs focussed on the primary subject because photography using the manual mode is fostered.

In the situation where selection of the automatic mode is made for photography using the self timer, it becomes possible to take photographs in which the focus is on the primary subject in most cases when no special composition is desired, even when the photographer is a novice who is not accustomed to manual area selection with such a multiple point focus detection camera. This reduces the possibility of errors occurring during picture taking.

In this way, there are benefits to using the manual mode or to using the automatic mode for photography when using the self timer. In addition, there are both advantages and disadvantages to equipping a camera with structure for selecting the mode to be used as a default during photography using the self timer in terms of cost and convenience of operation. Accordingly, such a camera can be made so that either the manual or the automatic mode is fixed as the predetermined default or so that the default is set based on the selection of the photographer. When the default mode is fixed beforehand, selection of either predetermined default mode may be based on the desired cost of the camera according to the user group for which the camera is intended.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

An explanation of preferred embodiments of a multiple point focus detection camera according to the present invention is provided hereafter, with reference to the drawings.

First, an explanation of the structure of the multiple point focus detection camera of a first embodiment is provided.

Figure 1:
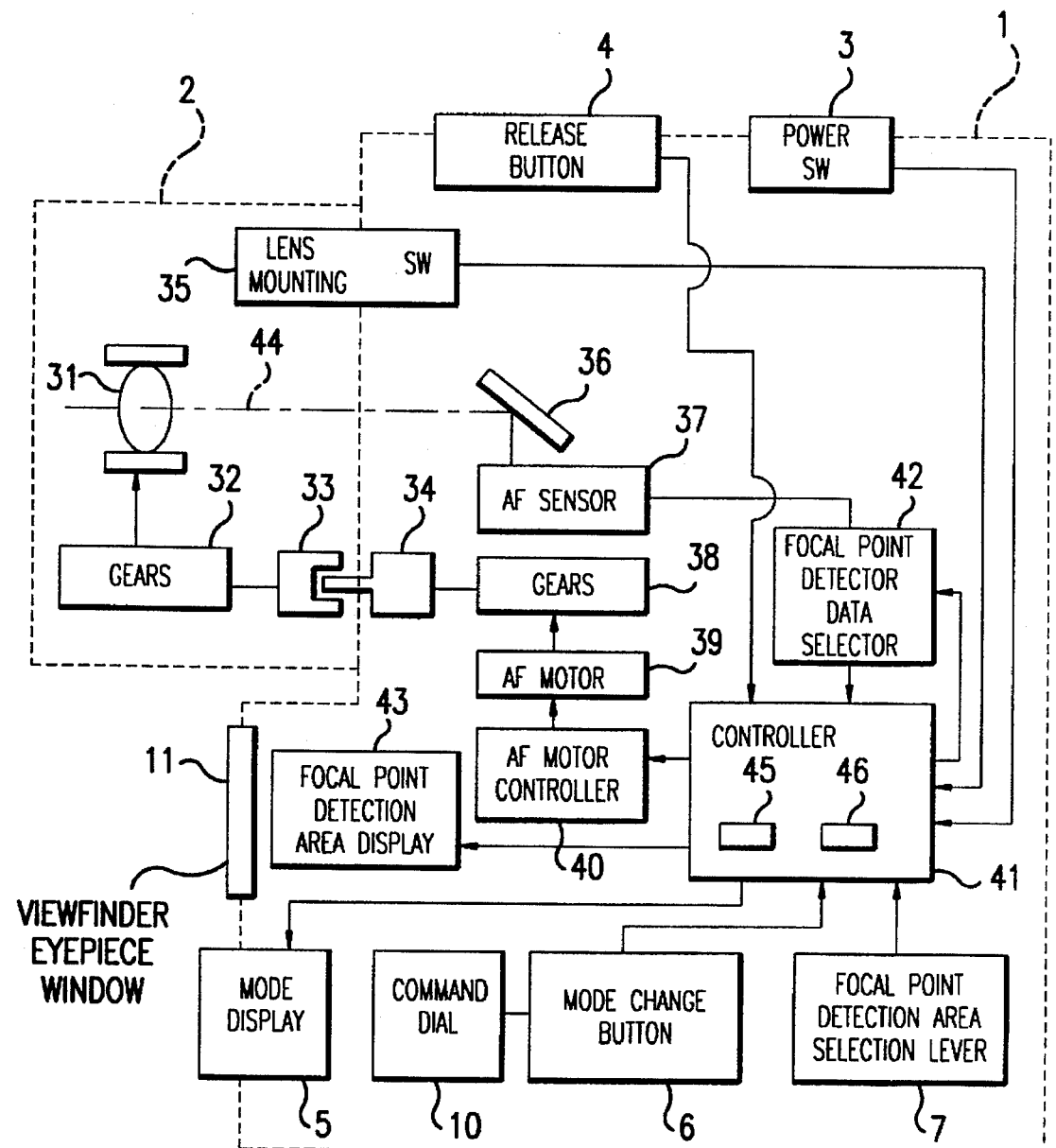
FIG. 1 is a block diagram showing the structure of a multiple point focus detection camera according to a first embodiment of the present invention.

The multiple point focus detection camera of the first embodiment includes, as shown in FIG. 1, a camera body 1 and an interchangeable lens 2.

In the lens 2 are arranged lens systems (not shown in the drawing) such as the focussing lens system 31, and gears 32 that move the focussing lens system 31 in the direction of the optical axis 44 in order to achieve focussing.

In the camera body 1 are provided a power switch 3 that turns the power source for the entire camera body 1 on and off, a release button 4 and a viewfinder eyepiece window 11. Furthermore, there is a mirror 36; an AF (auto-focus) sensor 37 that performs focus detection in the plurality of areas; a focus detection data selector 42 that selects the focus detection data; a mode change button 6 and a command dial 10 for receiving changes between the manual mode and the automatic mode from the photographer; a mode display 5 for displaying the mode that has been set; a selection lever 7 for receiving the focus detection area selection from the photographer; a focus detection area display 43 that displays the selected focus detection area; and a CPU 41 for controlling the operations of focus detection and focussing. Also provided are an AF motor 39 and gears 38 in order to supply drive power to the gears 32 for the lens 2, and an AF motor controller 40 for controlling the AF motor 39. Because FIG. 1 primarily shows the parts used in focus detection and focussing, the optical system used in photography, the shutter, the photography film, etc. are not shown in the drawing, but they are also provided in the camera.

Couplings 33 and 34 are provided at the place where the camera body 1 and the lens 2 come into contact with each other in order to transmit drive power from the gears 38 of the camera body 1 to the gears 32 of the lens 2. In addition, a lens mounting switch 35 is also provided on the camera body 1 side to detect when the lens 2 is switched.

The mode change button 6 and the command dial 10 receive the command of the photographer to switch between the two modes, i.e. the automatic mode and the manual mode. Setting the modes is accomplished by the photographer rotating the command dial 10 while depressing the mode change button 6.

Figure 9:
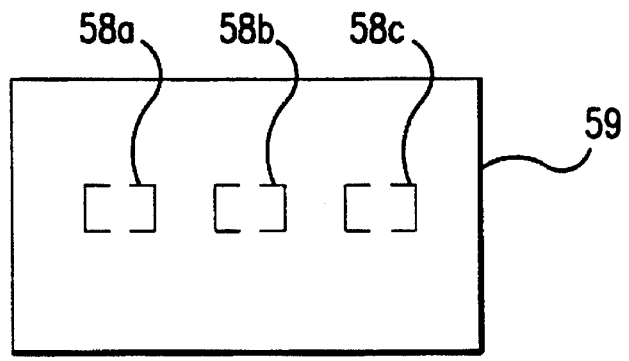
FIG. 9 is an explanatory diagram showing the position of focus detection areas in the multiple point focus detection camera of FIG. 1.
Figure 10:
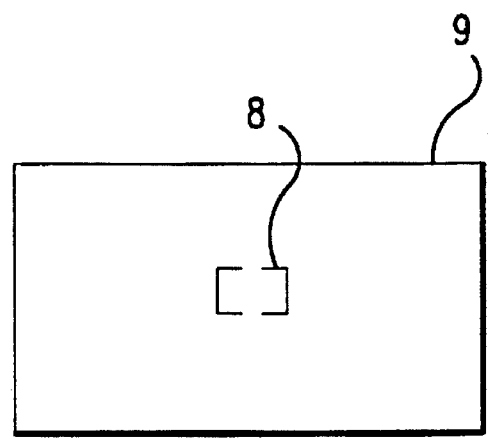
FIG. 10 is an explanatory diagram showing the position of the focus detection area in a conventional focus detection camera.
Figure 11:
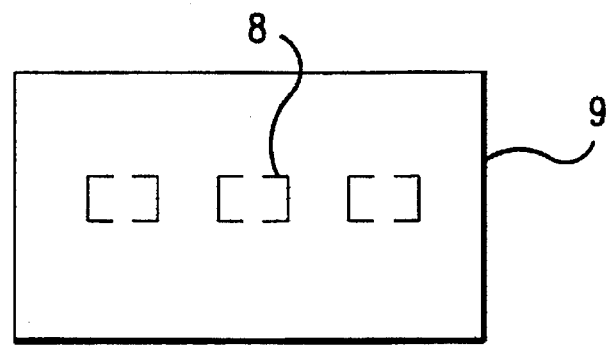
FIG. 11 is an explanatory diagram showing the position of the focus detection areas in a conventional multiple point focus detection camera.

One of the two modes is the manual mode wherein a picture is taken after the selection of one of the focus detection areas 58a, 58b or 58c, shown in FIG. 9 is received from the photographer by the operation of the focus detection area selection lever 7, with the focussing lens system 31 then being focussed on the area. During use of the manual mode, in order to select one of the focus detection areas 58a, 58b or 58c, the area selection lever 7 is slid, with the focus detection area switching to the next area each time the lever is slid.

In addition, the other mode is the automatic mode, wherein a picture is taken after the CPU 41 selects the area containing the primary subject from among the focus detection areas 58a, 58b or 58c through computer processing of the focus detection data, with the focussing lens system 31 then being focussed on the selected area.

The CPU 41 is connected to the lens mounting switch 35, the power switch 3, the focus detection data selector 42, the mode change button 6, and the focus detection area selection lever 7, from which signals are received by CPU 41 for processing. Commands are also sent by the CPU 41 by outputting signals to the AF motor controller 40, the focus detection area display 43 and the mode display 5. In addition, the CPU 41 is provided with memories 45 and 46. In memory 45 are pre-stored programs needed for the operation of the CPU 41. Memory 46 stores the mode set by the mode change button 6 and the area selected by the focus detection area selection lever 7. In addition, the CPU 41 is equipped with a computer not shown in the drawing for operating the CPU by reading the programs stored in memory 45. In addition, the CPU 41 constantly displays the mode (either the automatic or manual mode) stored in memory 46 using the mode display 5.

In the present embodiment, the AF sensor 37 measures the discrepancy between the focus of the focussing lens system 31 and the subject corresponding to the three focus detection areas 58a, 58b and 58c arranged, for example, in a horizontal row in the center of the field of vision 59 of the viewfinder.

Figure 2A:
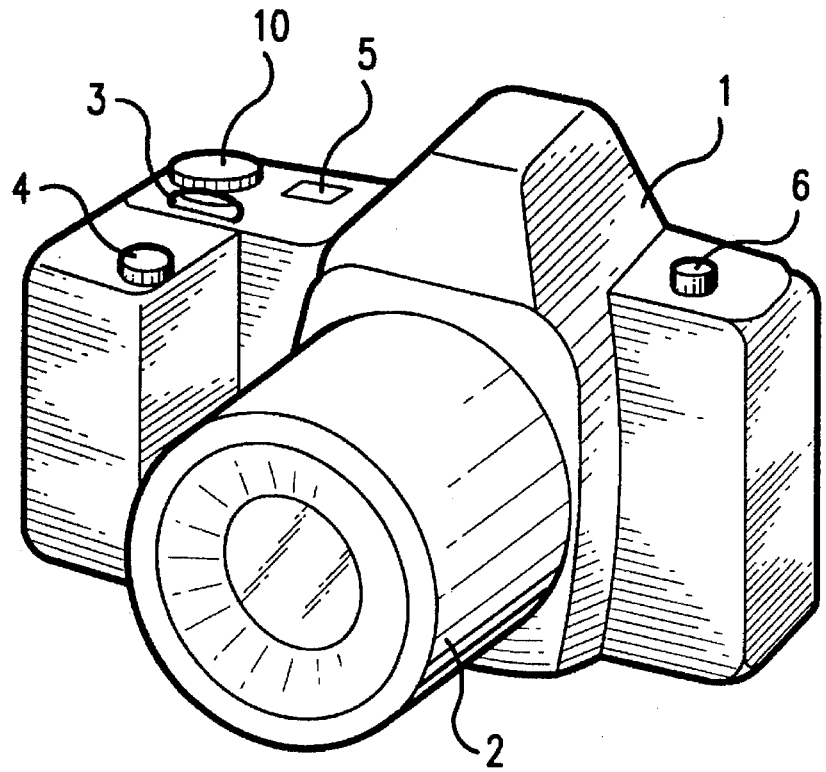
FIG. 2A is an oblique view of a camera showing the external appearance of the multiple point focus detection camera of FIG. 1.
Figure 2B:
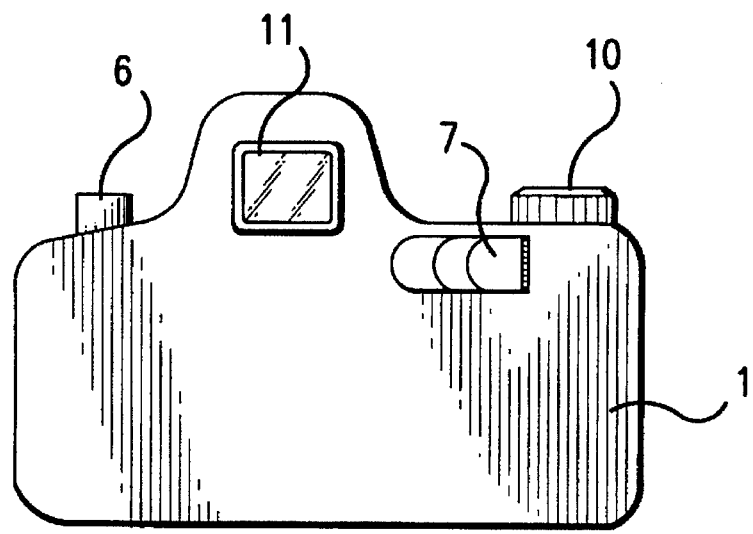
FIG. 2B is a rear view showing the external appearance of the multiple point focus detection camera of FIG. 1.

An explanation of the external appearance of a camera according to the present embodiment is provided hereafter with reference to FIGS. 2A and 2B.

The power switch 3, release button 4, mode display 5, mode change button 6 and command dial 10 are mounted on the top of the camera body 1. Furthermore, the viewfinder eyepiece window 11 and the area selection lever 7 are provided on the back surface of the camera body 1.

Figure 3A:
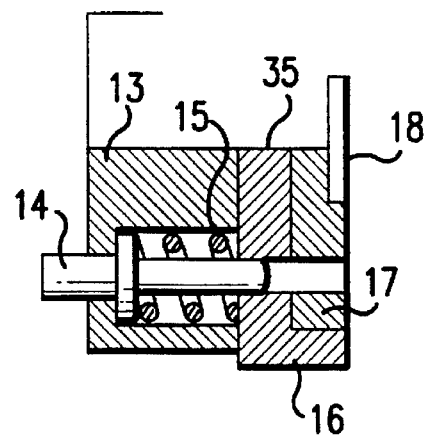
FIG. 3A is a partial cross-section showing one possible structure of a lens mounting switch of the multiple point focus detection camera of FIG. 1.
Figure 3B:
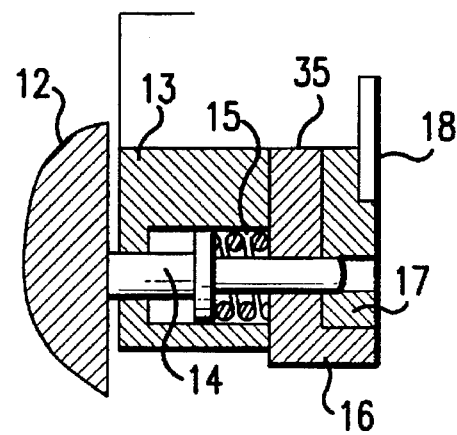
FIG. 3B is a partial cross-section showing the state of the lens mounting switch of FIG. 3A during mounting of a lens.
Figure 3C:
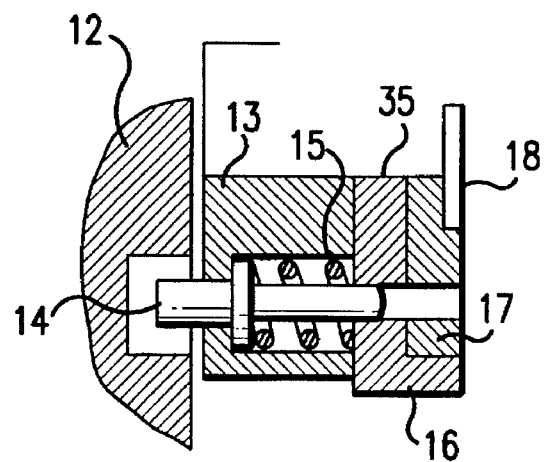
FIG. 3C is a partial cross-section showing the state of the lens mounting switch of FIG. 3A with a lens mounted.

FIGS. 3A-C depict the structure of the lens mounting switch 35. FIG. 3A shows the configuration of the switch 35 prior to the mounting of lens 2, where a pin 14 and a coil spring 15, which forces the pin 14 in the direction of the lens 2, are provided in a sunken area in the body side mount 13. In addition, on the base of the mount 13 are an insulator 16 such as plastic or the like, a metal piece (conductor) 17 and a flexible base plate 18 which is electrically connected to the metal piece 17. The flexible base plate 18 is also electrically connected to the CPU 41. The length of the pin 14 is adjusted so that in the configuration prior to the mounting of the lens 2, as shown in FIG. 3A, the tip of the pin 14 protrudes from the mount surface and the back end of the pin 14 is not in contact with the metal piece 17. During mounting of the lens 2, as shown in FIG. 3B, the pin 14 is depressed by the lens side mount 12 and withdraws from the mount surface, causing the back end of the pin 14 to contact the metal piece 17, by which a signal is generated and conveyed to the CPU 41. FIG. 3C shows a configuration after mounting of the lens 2 has been completed, at which point the tip of the pin 14 has fallen into a cavity provided in the lens mount 12, so that the pin returns to the position of FIG. 3A, and is separated from the metal piece 17, thereby cutting the mounting signal. Accordingly, signals from the lens mounting switch 35 are produced only during mounting and switching of the lens 2.

Figure 4:
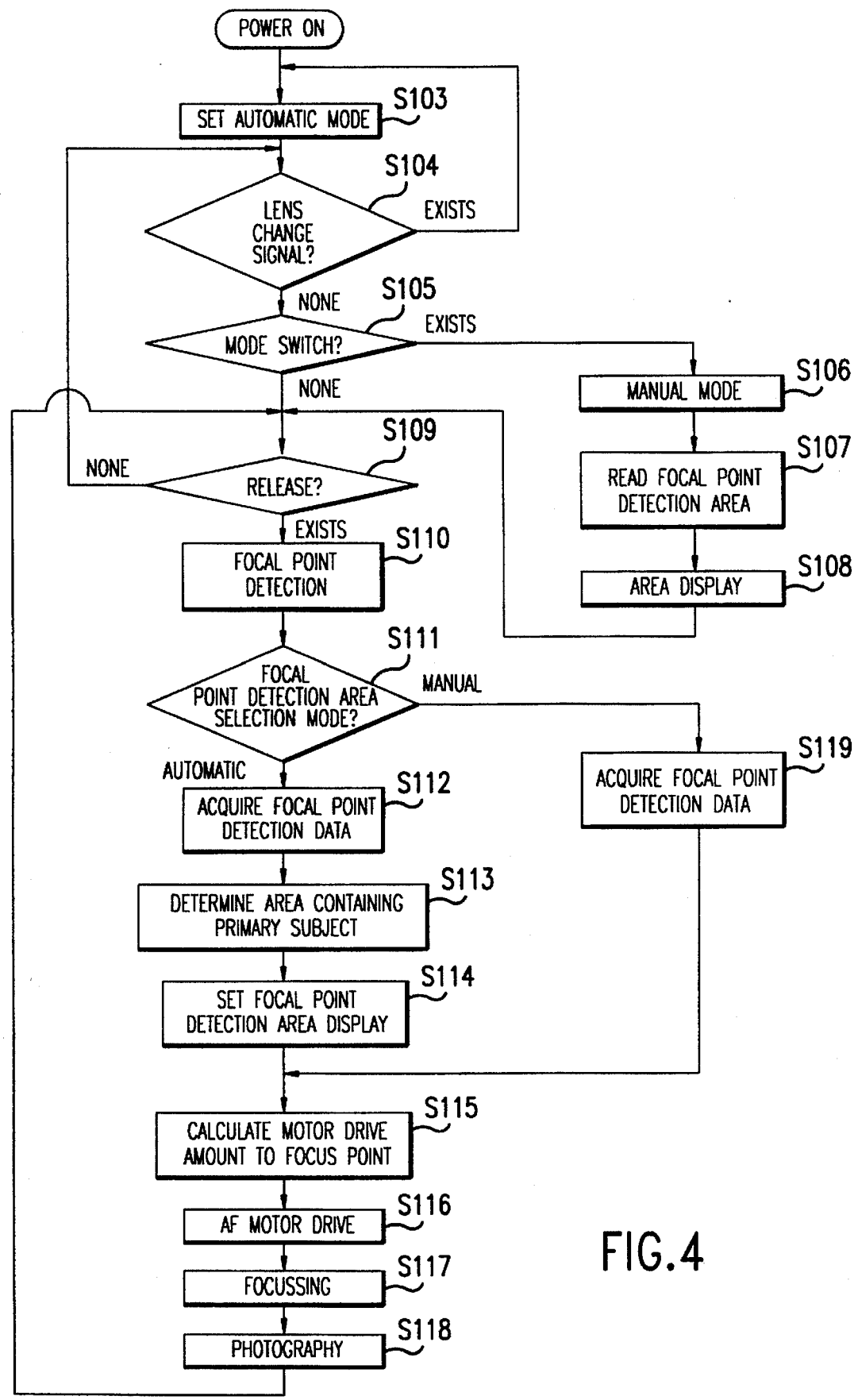
FIG. 4 is a flow chart showing the operation of the multiple point focus detection camera of FIG. 1.

A further explanation of the operation of the multiple point focus detection camera of the present embodiment is provided hereafter, with reference to the flow chart of FIG. 4.

First, when the power switch 3 is turned on by the photographer, the computer in the CPU 41 reads the program stored in memory 45 and initiates operations according to the program. Initially, in step S103, the CPU 41, regardless of the mode currently stored, stores the automatic mode in the memory 46. Next, the CPU 41 advances to step S104 and determines whether a lens change signal has been sent from the lens mounting switch 35. If a signal indicating a lens change has been sent, the CPU 41 returns to step S103 and stores the automatic mode in memory 46. If a signal indicating a lens change has not been sent, the CPU advances to step S105.

In step S105, when a mode change signal has been sent from the mode change button 6, the CPU 41 changes the mode in memory 46 to the manual mode, and advances to step S106. If it has not been sent, the CPU advances to step S109. In step S107, the CPU 41 reads the focus detection area in memory 46. In other words, it reads which of the focus detection areas 58a, 58b or 58c is indicated by the focus detection area selection lever 7, and stores this in memory 46. Furthermore, the CPU 41 causes the focus detection area read to be displayed on the focus detection area display 43 (step S108), and then advances to step S109. The photographer can select an area while looking through the viewfinder eyepiece window 11 and verifying the display of the selected focus detection area 58a, etc. as shown on the focus detection area display 43 in the field of vision of the viewfinder.

In step S109, the CPU 41 determines whether a release signal has been sent from the release button 4, and if it has been sent advances to step S110, while if the release signal has not been sent, it repeats the steps from S103 on. Accordingly, with the multiple point focus detection camera of the present embodiment, the automatic mode is assuredly set when the power source is engaged or when the lens is switched, and photography is undertaken in the automatic mode as long as the command for a mode change is not given by operation of the mode change button 6 and the command dial 10. The photographer can change modes while verifying the mode on the mode display 5 when photography using the manual mode is desired.

When a release signal from the release button 4 has been sent in step S109, the CPU 41 commands the AF sensor 37 to perform focus detection via the focus detection data selector 42. Light which has passed through the focussing lens system 31 has its direction changed by mirror 36 and is led to the AF sensor 37. The CPU 41 controls the AF sensor so as to perform focus detection (in step S110). The AF sensor 37 uses the light to perform focus detection on the subject corresponding to focus detection areas 58a–58c, and sends the results of the focus detection (focus detection data) to the focus detection data selector 42.

In step S111, the CPU 41 controls the focus detection data selector 42 so that it sends the necessary focus detection data. At this time, the CPU 41 reads the mode stored in memory 46. If this is the automatic mode, control is accomplished so that the focus detection data from the three focus detection areas 58a–58c is output to the CPU 41. In addition, when the mode stored in memory 46 is the manual mode, the CPU directs only the focus detection data from the selected area stored in step S107 from among the three focus detection areas 58a–58c to be sent to the CPU 41, the focus detection data selector 42 selecting the necessary focus detection data and sending it to the CPU 41, and the CPU 41 receiving the same (steps S112, S119).

In the automatic mode, using a commonly known algorithm, the CPU 41 processes the focus detection data from the three focus detection areas 58a–58c received in step S112, determines in which of these three areas, 58a, etc. the primary subject is located, and determines the area on which to focus (step S113). After determining the area, the CPU 41 sends a signal to the focus detection area display 43 and displays the determined focus detection area (for instance, focus detection area 58a) to distinguish it from the other areas (step S114).

The CPU 41 selectively uses the focus detection data from the selected focus detection area 58a to compute to what extent it must drive the AF motor 39 in accordance with the amount of movement of the focussing lens system 31 needed in order to focus the focussing lens system 31. This computation is sent to the AF motor controller 40, and driving is commanded (steps S115 and S116).

The AF motor controller 40 drives the AF motor 39 a certain amount based on the signal from the CPU 41 indicating the drive amount. This driving force is transmitted to gears 32 inside the lens via gears 38 inside the camera and couplings 34 and 33, focussing being completed when the focussing lens system 31 has been moved to the focussing position (step S117). The CPU 41 indicates to the photography optical system, i.e. the shutter, etc. that focussing has been completed and thereafter commands picture taking. The CPU 41 then returns to step S109 and waits for the next release signal (step S118).

In addition, when the manual mode is used, the CPU 41 advances to step S115 because data from focus detection area 58a, which has been selected by the focus detection area selection lever 7, has been sent to the focus detection data selector 42 in step S119. The CPU then computes the drive amount for the AF motor 39 using focus detection data and sends it as a signal to the AF motor controller 40.

In this way, with the multiple point focus detection camera of the first embodiment, selection of the focus detection area to be focussed on can be performed in the manual mode or the automatic mode. However, when the power source is engaged or when the lens is switched, the automatic mode is assuredly set even if the previous mode had been the manual mode. Therefore, it is not necessary before taking a picture to verify each time whether photography had been performed in the automatic mode or in the manual mode prior to engaging the power source or prior to switching lenses. Thus, when photography using the automatic mode is desired it can be undertaken without any changes. When photography using the manual mode is desired the mode can be changed thereby boosting operability.

Accordingly, when the photographer is a novice, mistakes that conventionally arise can be greatly reduced (for example, in cases where a number of individuals use a single camera and think that the camera is set in the automatic mode, not realizing that it is set in the manual mode, thereby causing a photograph to be taken that is not focussed on the primary subject). Even when the camera is used by professionals or advanced amateurs, mistakes will be minimized due to the fact that focussing on a primary subject is normally accomplished in the automatic mode when no special compositions are desired, even if the camera is forcibly set to the manual mode. In addition, because it will be understood that the automatic mode will be set when the power source is engaged or when the lens is switched, the mode can be changed when the manual mode is desired.

In the primary embodiment described above, the structure was such that the automatic mode was set every time the power source was engaged or when the lens was switched. However, a structure wherein the automatic mode is set when only one of these events occurs is also within the scope of this invention.

Figure 5:
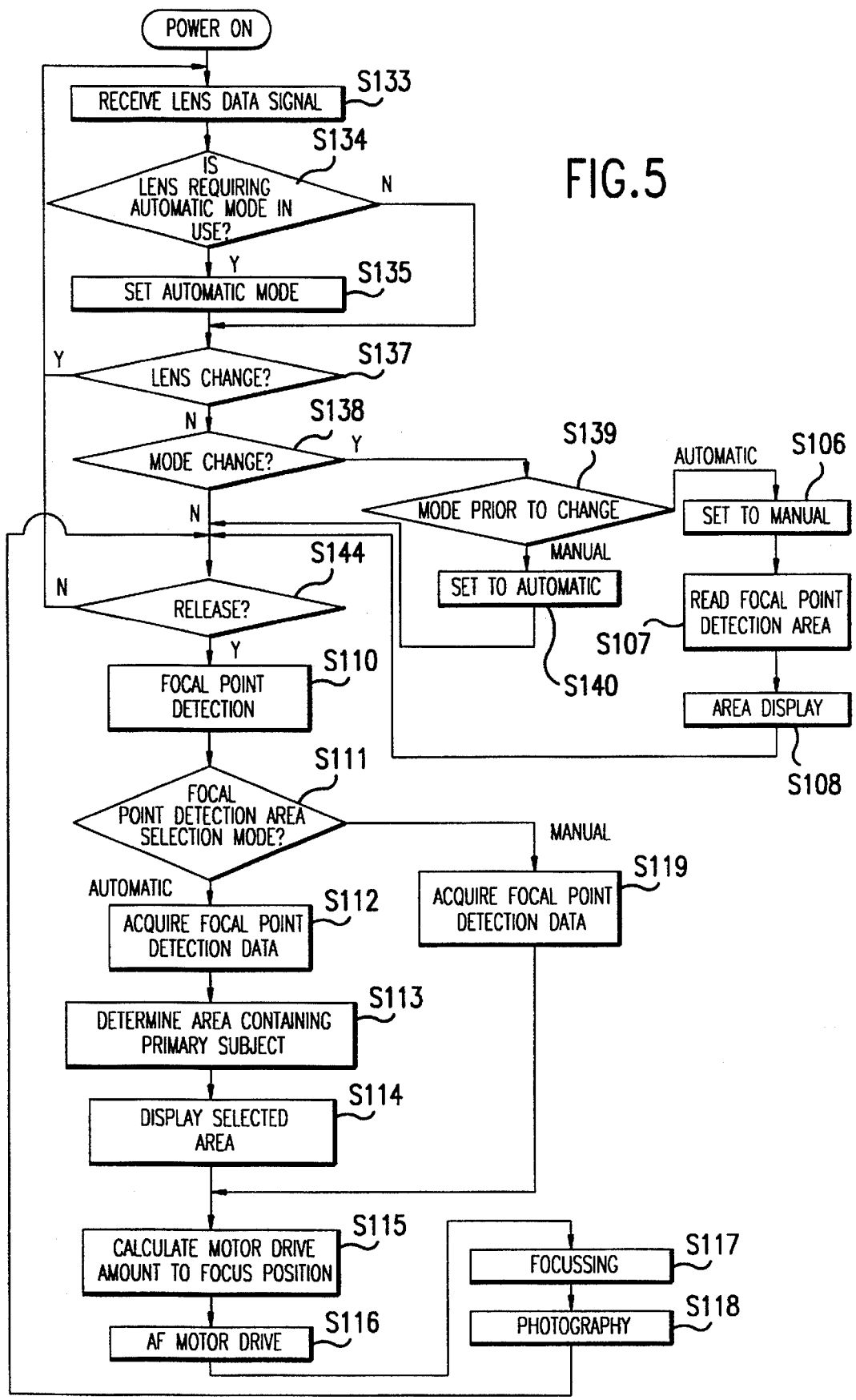
FIG. 5 is a flow chart showing the operation of the multiple point focus detection camera of a second embodiment of the present invention.

Operation of the multiple point focus detection camera according to the second embodiment will now be described with reference to FIG. 5.

When the power switch 3 is turned on by the photographer, the computer in the CPU 41 reads the program stored in memory 45 and initiates operations following the program. First, in step S133, the CPU 41 communicates with the lens CPU 61 via the lens connections 62 and 63, receives lens data, and stores it in memory 46. In the next step S134, the CPU 41 reads the stored lens data, and determines whether it satisfies criteria (set beforehand) identifying a lens used by professionals and advanced amateurs. The criteria is included in the program prestored in memory 45. In the present embodiment, for instance, a lens with a bright F-value on the order of 400/2.8 and 80–200/2.8 is considered to be a lens used by professionals and advanced amateurs. Furthermore, once the determination is made that the lens is one used by professionals and advanced amateurs, the forcible setting of the automatic mode is not executed, so the CPU advances to step S137. Accordingly, because the mode which was used prior to the engagement of the power source remains in memory 46, this mode is set as the manual mode if it had been in the manual mode, and is set as the automatic mode if it had been in the automatic mode. In addition, when it is determined that the lens is not one used by professionals and advanced amateurs, the CPU advances to step S135 in order to forcibly set the automatic mode.

In step S135, the CPU 41 stores in memory 46 the automatic mode, regardless of the mode stored prior to that time, and then advances to step S137.

In step S137, the CPU 41 determines whether a lens change signal has been sent from the lens mounting switch 35. When a signal indicating a lens change has been sent, the CPU 41 returns to step S133, communicates with the switched lens 2, and stores the lens data in memory 46. When a signal indicating a lens change has not been sent, the CPU 41 advances to step S138.

In step S138, when a mode change signal has been sent from the mode change button 6, the CPU 41 changes the mode in memory 46. When the mode stored in memory 46 prior to the change is the automatic mode, the CPU moves to step S106 and changes the memory to the manual mode. In the subsequent step S107, the CPU reads which of the focus detection areas 58a, 58b or 58c is indicated by the focus detection area selection lever 7, and stores the information in memory 46. Furthermore, the CPU 41 causes the focus detection area read to be displayed on the focus detection area display 43 (step S108), and then advances to step S144. The photographer can select an area while looking through the viewfinder eyepiece window 11 and verify that the selected focus detection area 58a, etc. is displayed on the focus detection area display 43 in the field of vision of the viewfinder. In addition, when the mode stored in memory 46 prior to the change is the manual mode, the CPU 41 sets the automatic mode in step S140 and then advances to step S144.

In step S144, the CPU 41 determines whether a release signal has been sent from the release button 4, in which case the CPU advances to step S110, and if it has not been sent, the CPU returns to step S133 and repeats the steps described above while waiting for the release signal. Accordingly, with the multiple point focus detection camera of the present embodiment, when it is determined using criteria established beforehand that the mounted lens is not a lens used by professionals and advanced amateurs, the automatic mode is assuredly set and photography is performed using the automatic mode as long as a mode change is not commanded by the operation of the mode change button 6 or the command dial 10. When the photographer wishes to take pictures using the manual mode, he need only change modes while verifying the mode in the mode display 5.

From step S110 onward, the embodiment is the same as the first embodiment, so the explanation of these steps is omitted.

In this manner, the multiple point focus detection camera of the present embodiment determines whether the mounted lens is a lens used by professionals and advanced amateurs in order to determine whether to forcibly set the automatic mode. When it is determined that the lens is not one used by professionals and advanced amateurs, the automatic mode is set regardless of whether the manual mode had been set or the automatic mode had been set prior to the engagement of the power source or the switching of lenses. Thus, it becomes unnecessary to take photographs after verifying whether photography using the manual or automatic mode had been performed prior to the engagement of the power source or the changing of lenses such that when photography using the automatic mode is desired it can be undertaken without any changes; when photography using the manual mode is desired the mode can be changed thereby boosting operability. Accordingly, when the photographer is a novice and where a number of different individuals are using or have used a single camera, mistakes that conventionally arise, examples of which were given before, can be greatly reduced.

Often when it is determined that the lens is one used by professionals and advanced amateurs it is because a special composition is required. In these cases use of the manual mode is more frequent than with general users. In addition professional or advanced amateur photographers are less likely to make mistakes caused by thinking that the camera is set in the automatic mode when it is actually set in the manual mode compared with general photographers and novices. With the present embodiment, when it is determined from the mounted lens that the photographer is a professional or advanced amateur, the automatic mode is not forcibly set and the camera remains in the mode that was in use prior to the engagement of the power source or the changing of lenses.

Figure 8:
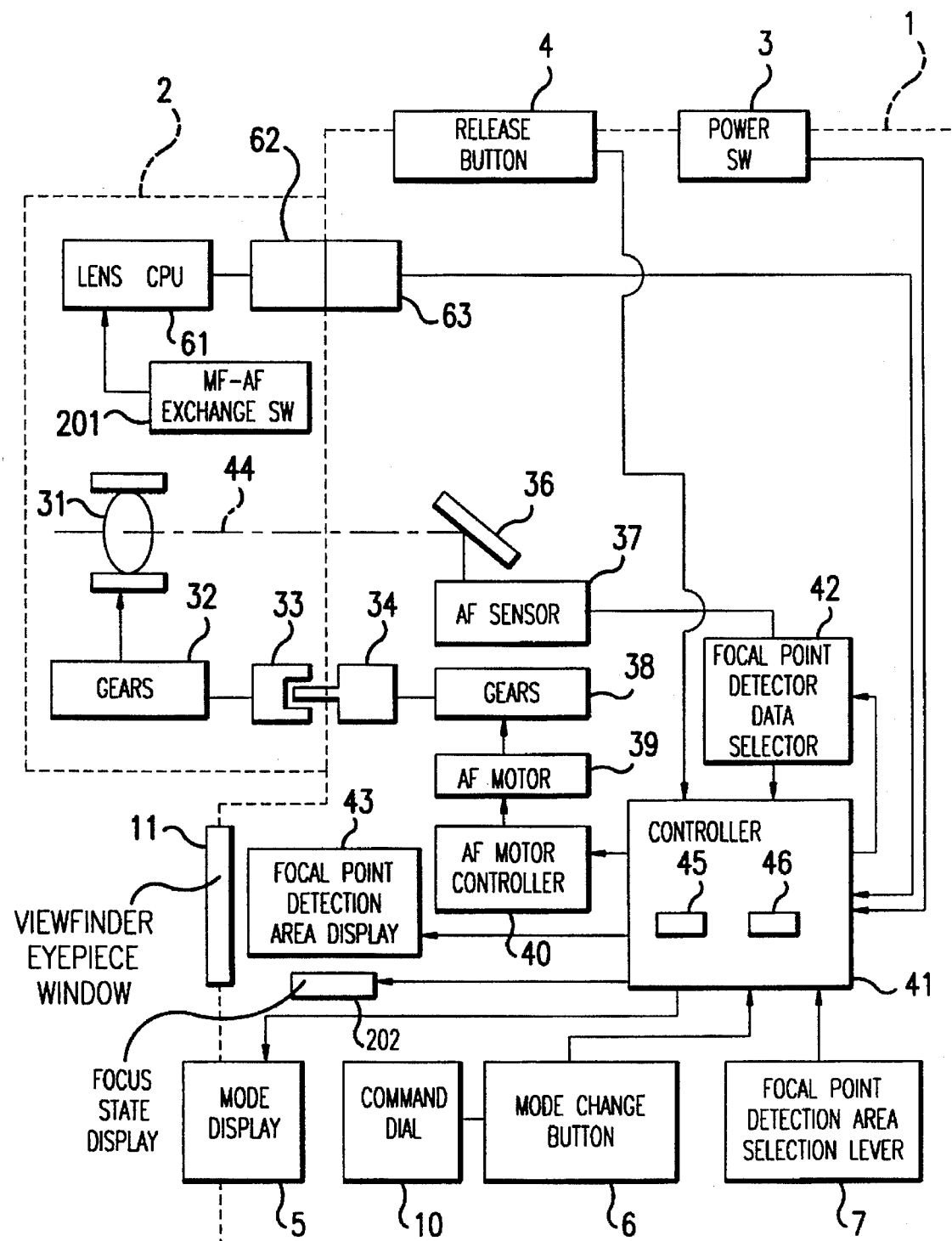
FIG. 8 is a block diagram showing the structure of the multiple point focus detection camera of FIG. 6.

An explanation of the structure of the third embodiment of the multiple point focus detection camera is provided hereafter with reference to FIG. 8.

The camera of the third embodiment of the present invention is a camera that, during photography using a manual focus (MF), can use a focus detection function as a focus aid to notify the photographer whether the camera is in a focussed state. When the focus detection function is used as a focussing aid, the actual action of automatic driving of the camera lens for focussing is not performed. However, the selection or determination of the focus detection area is made using either the automatic detection mode or the manual detection mode (the same as with AF). Then, a determination is made as to whether the lens is focussed on the subject in a given area. Thereafter, the photographer is notified of the results. The photographer can then manually adjust the lens if desired until the photographer is notified that the lens is in focus.

When the focus detection function is used as a focus aid during MF photography, there can be mistakes made because of differences between the focus detection area selected in the manual mode and the area where the subject recognized by the user as the primary subject is located when the photographer thinks the camera is set to the automatic mode (but it is actually set to the manual mode). In this instance, the present embodiment is structured so that the automatic detection mode is forcibly set when the AF-MF switch is switched to MF, thereby preventing the mistakes outlined above. Thus, when manual focusing (MF) is set, the camera is automatically set to the automatic detection mode.

The multiple point focus detection camera of the present embodiment is, as shown in FIG. 8, structured the same as in the second embodiment of the invention. However, in this instance an MF-AF switch 201, which receives from the photographer the notification of switching between MF and AF is also provided in the lens 2, the MF-AF switch 201 being connected to the lens CPU 61. In addition, a focus state display 202 is also provided in the field of vision of the viewfinder eyepiece window 11 in order to indicate to the photographer whether the lens 31 is focussed. The rest of the structure is the same as the camera of the second embodiment, so an explanation of the same has been omitted. In addition, a lens mounting switch 35 is not provided.

Figure 6:
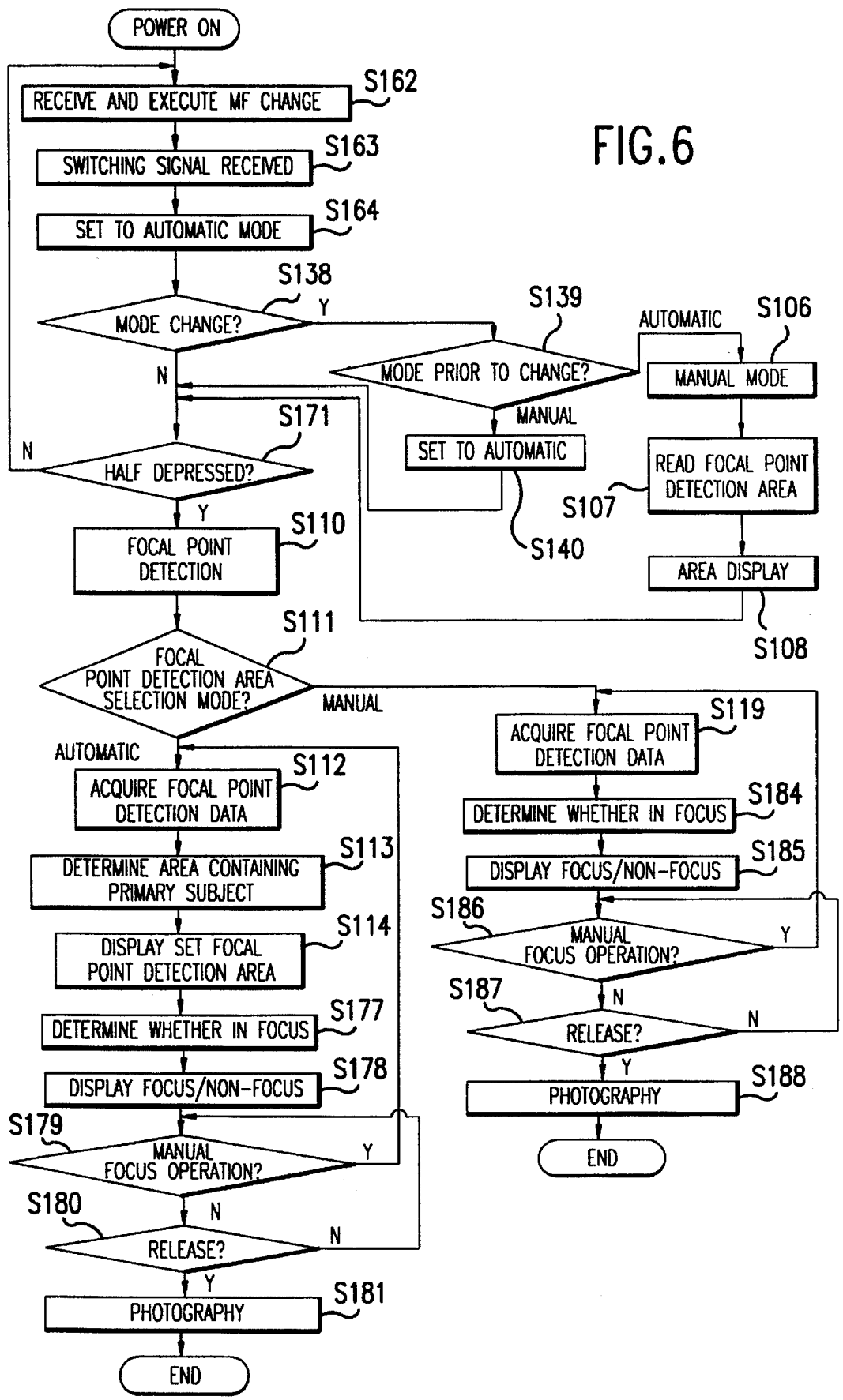
FIG. 6 is a flow chart showing the operation of the multiple point focus detection camera of a third embodiment of the present invention.
Figure 7:
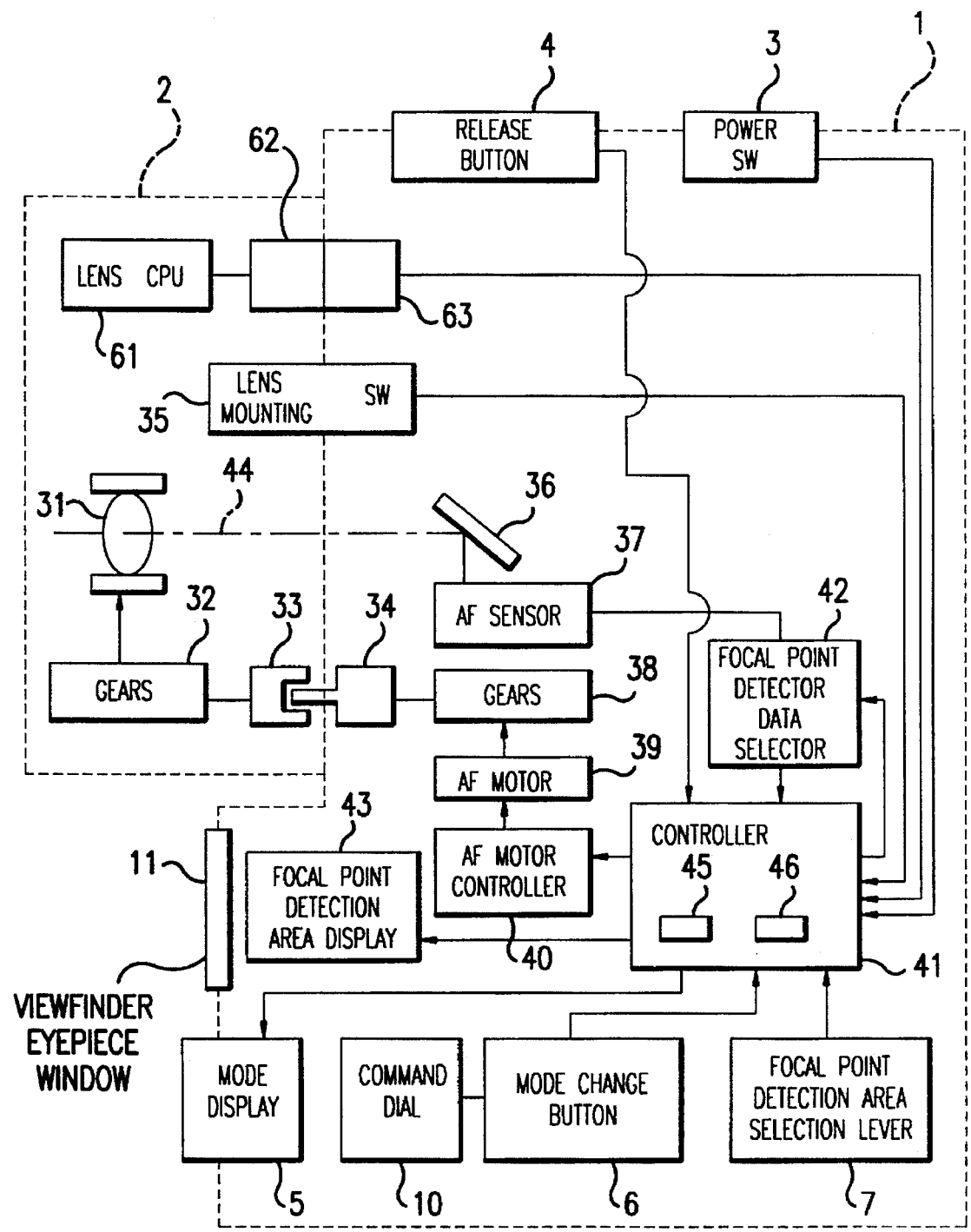
FIG. 7 is a block diagram showing the structure of the multiple point focus detection camera of FIG. 5.

A detailed explanation is provided hereafter, with reference to FIG. 6.

When the power switch 3 is turned on by the photographer, the computer in the CPU 41 reads the program stored in memory 45 and initiates operations following the program. First, the CPU 41 communicates with the lens CPU 61 via the lens connections 62 and 63, receives lens data, storing it in memory 46. In addition, the CPU 41 is told via the lens CPU 61 whether the AF-MF switch 201 is set to AF or set to MF. The CPU 41 receives MF switching in step S162. Next, the CPU 41 receives the signal from the AF-MF switch 201 via the lens CPU 61.

When the CPU 41 is notified that the switch is set to MF photography, in step S164 it stores the automatic detection mode in memory 46 regardless of the mode currently stored there, and then advances to step S138.

In step S138, when a mode change signal has been sent from the mode change button 6, the CPU 41 changes the mode in memory 46 by executing the actions in steps S139, S140, S106, S107 and S108. Since these actions were explained in the steps of the second embodiment, an explanation of the same is omitted. These steps allow the user to select the manual or automatic detection modes, in effect over-riding the function of forcibly setting the automatic detection mode.

When the release button 4 is not depressed halfway (step S171), the CPU 41 returns to step S162.

When the release button 4 has been depressed halfway, the CPU 41 performs focus detection and acquires the focus detection area data in accordance with the focus detection area selection mode stored in memory 46. When the manual mode is set, only the data in the indicated focus detection area is acquired, while if the automatic mode is set, data is acquired from all focus detection areas and the area containing the primary subject is determined by computations (steps S110, S111, S119, or S111 S112, S113 and S114).

Furthermore, with either the manual mode or the automatic mode, a determination is made by the CPU 41 using commonly known methods as to whether the current position of the focussing lens system 31 is focussed on the area either selected or determined (steps S177, S184), the result being displayed on the focus state display 202. The photographer can move the focussing lens system 31 to the focussed state while verifying the display. Using a commonly known method, the CPU 41 determines whether the focussing lens system 31 has been driven by manual focus operations (steps S186, S179), in which case the CPU returns to the steps (S119, S112) where it again acquires focus detection data, and if it has not been driven, it determines whether the release button 4 is completely depressed (steps S186, S179), and returns to steps S186 and S179 and repeats the operations described above until the release button is completely depressed. If the release button 4 is completely depressed, photography is performed (steps S188, S181).

Accordingly, a photographer can take a photograph by completely depressing the release button 4 after manually driving the focussing lens system 31 to a satisfactory focus state while viewing through the viewfinder either until an in-focus display appears on the focus state display 202 or until the lens is in a state having a desired discrepancy from the focus state.

In this way, the camera of this embodiment of the present invention is easy to use because it is not necessary to verify whether the camera is set in the automatic detection mode or in the manual detection mode when the focus detection function is used as a focus aid because the automatic detection mode is forcibly set when the camera is set to MF. Photographers desiring to use the focus aid with the manual detection mode can change modes by simply operating the mode change button 6 without verifying the mode, because it is understood that the automatic detection mode is forcibly set. In addition, conventional problems, such as taking a photograph while relying on the focus aid when thinking the camera is set to an automatic detection mode when it is actually set to the manual detection mode, can be greatly reduced.

A fourth embodiment of the present invention will now be described with reference to FIG. 12. Since many elements of this embodiment are similar to those described previously, only those elements which are necessary to realize this embodiment will be discussed.

Figure 12:
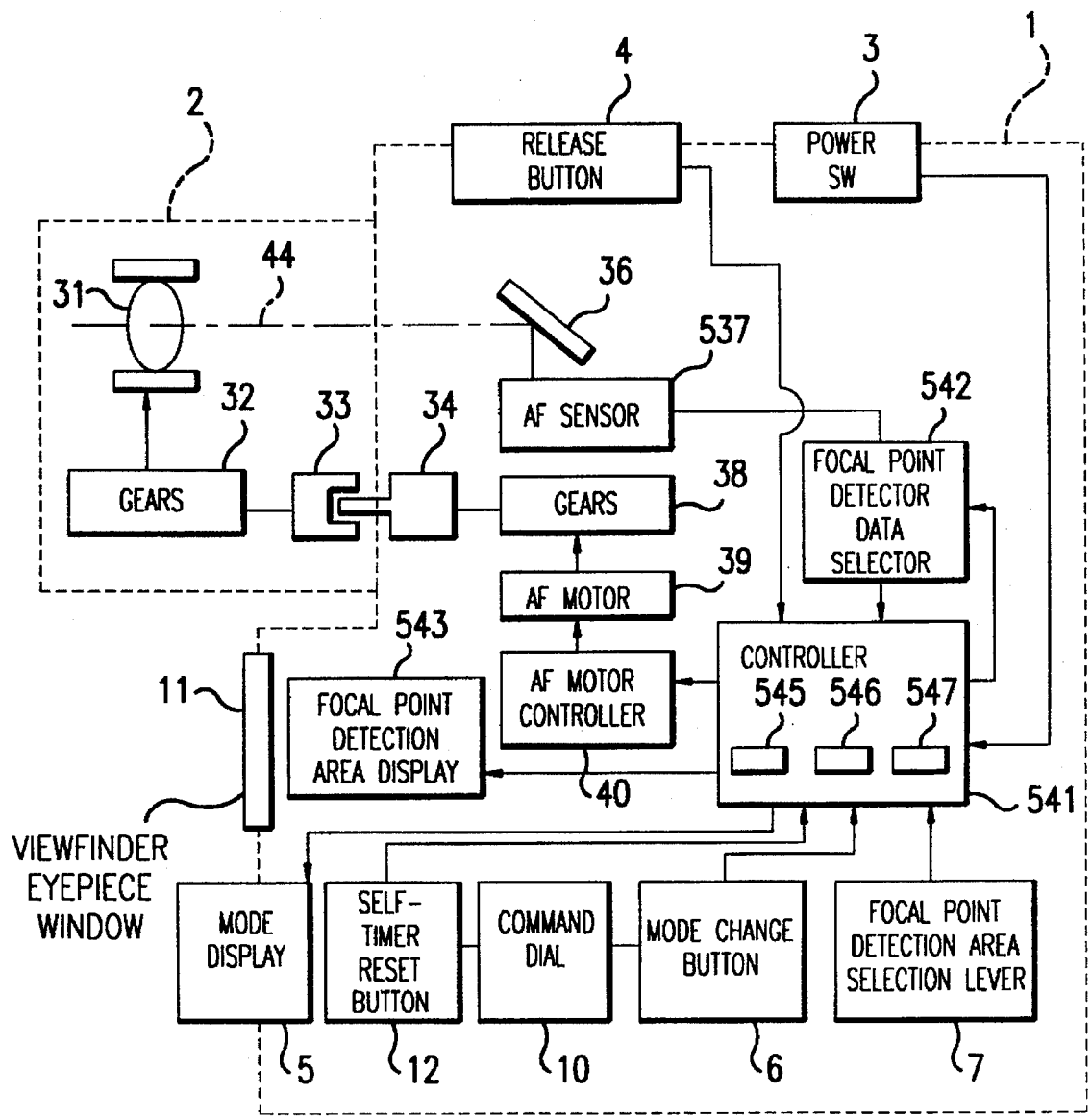
FIG. 12 is a block diagram showing the structure of a multiple point focus detection camera according to a fourth embodiment of the present invention.
Figure 16A:
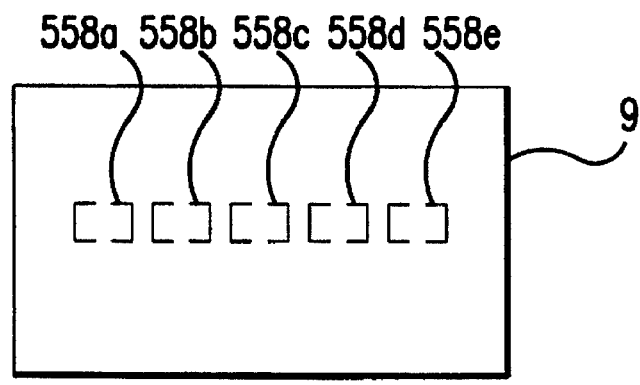
FIGS. 16A-E are explanatory diagrams showing the positions of focus detection areas in the multiple point focus detection camera of FIG. 12.

Referring to FIG. 12 an AF sensor 537 is provided for detecting the discrepancy between the focus of a focussing lens system 31 and the subject positioned in five areas 558a, 558b, 558c, 558d, and 558e shown in FIG. 16A. A focus detection data selector 542, which selects the focus detection data; a mode change button 6 and a command dial 10 for receiving changes in mode setting from the photographer; a mode display 5 for displaying a mode that has been set; a selection lever 7 for receiving the focus detection areas selected by the photographer; a focus detection area display 543 that displays the selected focus detection area; and a CPU 541 for controlling the operations of focus detection and focussing are also provided. A self timer setting button 12 is provided in order to receive from the photographer a command for photography using the self timer.

The mode change button 6 and command dial 10 receive from the photographer a selection of either the automatic or manual mode for determining how the areas used in focussing will be set from among the plurality of focus detection areas. One of two modes is the manual mode, wherein a picture is taken after selection of one of the focus detection areas 558a, 558b, 558c, 558d or 558e is made by the photographer through the operation of the focus detection area selection lever 7, the focussing lens system 31 being focussed on this area. The other mode is the automatic mode wherein a picture is taken after the CPU 541 selects the area containing the primary subject from among the focus detection areas 558a, 558b, 558c, 558d and 558e shown in FIG. 16A, through processing based on a known algorithm that prioritizes the focus detection data with the focussing lens system 31 being focussed on the selected area.

During use of the manual mode, in order to select one of the focus detection areas 558a, 558b, 558c, 558d or 558e, the area selection lever 7 is slid. The focus detection area switches to the next area each time the lever is slid.

In addition, the camera of the present embodiment can select one of either the automatic or manual mode as a default mode for photography using a self timer. The selection of one of these modes as the default is received beforehand from the photographer. This selection is made by operation of the self timer setting button 12 and the command dial 10. Specifically, it is performed by rotating the command dial 10 while depressing the self timer setting button 12.

When the self timer is not used (as in normal photography) and the automatic mode is selected, focus detection data is obtained from the five focus detection areas 558a–558e shown in FIG. 16A. A single piece of focus detection data is found from the five focus detection areas by following the algorithm. Automatic focus adjustment control is performed in accordance with this data.

Figure 16B:
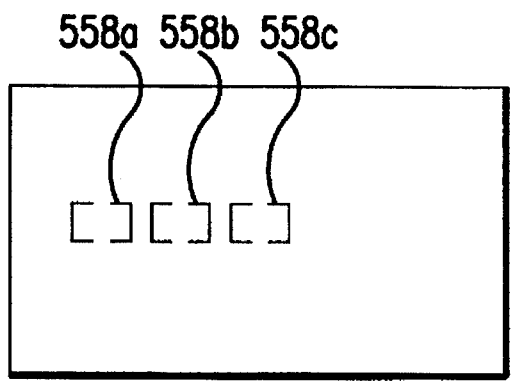
Figure 16C:
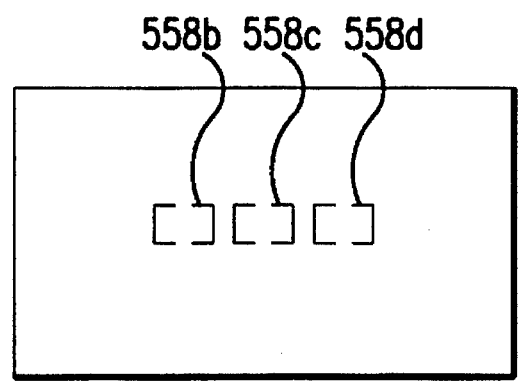
Figure 16D:
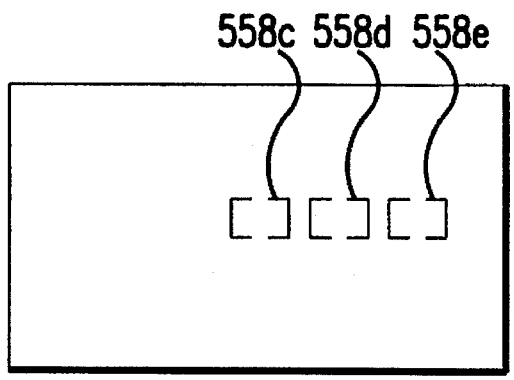

In the present embodiment, the automatic mode set as the default uses focus detection data corresponding to, for instance, the three central areas (i.e. areas 558b, 558c and 558d as shown in FIG. 16C) from among the five focus detection areas shown in FIG. 16A. The data closest to the camera from among the focus detection data is selected on the basis of a Known algorithm, and focussing control is performed. Furthermore, as shown in FIG. 16B–D, the three areas noted above can be selected in accordance with the desires of the photographer.

Figure 16E:
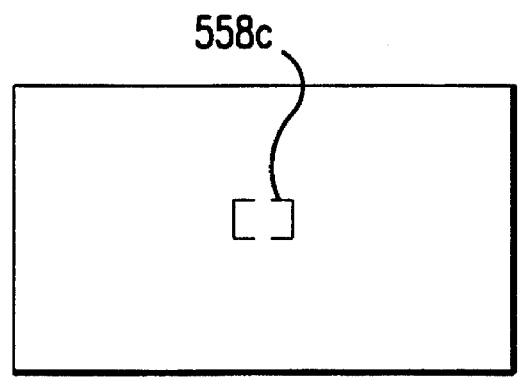

When the manual mode is set for use with the self timer, the central area 558c shown in FIG. 16E is selected as the initial focus detection area.

The CPU 541 is provided with memories 545, 546 and 547. In memory 545 are pre-stored programs needed for the operation of the CPU 541. In memory 547 is stored the default mode set when using the self timer, which in turn is selected through the operation of the self timer setting button 12 and the command dial 10, as described above. Memory 546 stores the mode set by the mode change button 6 and the areas selected by the focus detection area selection lever 7. The CPU 541 is equipped with a computer, not shown in FIG. 12. The CPU operates by reading the programs stored in memory 545. The CPU 541 constantly displays the mode (either the automatic mode or the manual mode) stored in memory 546 using the mode display 5.

Figure 13:
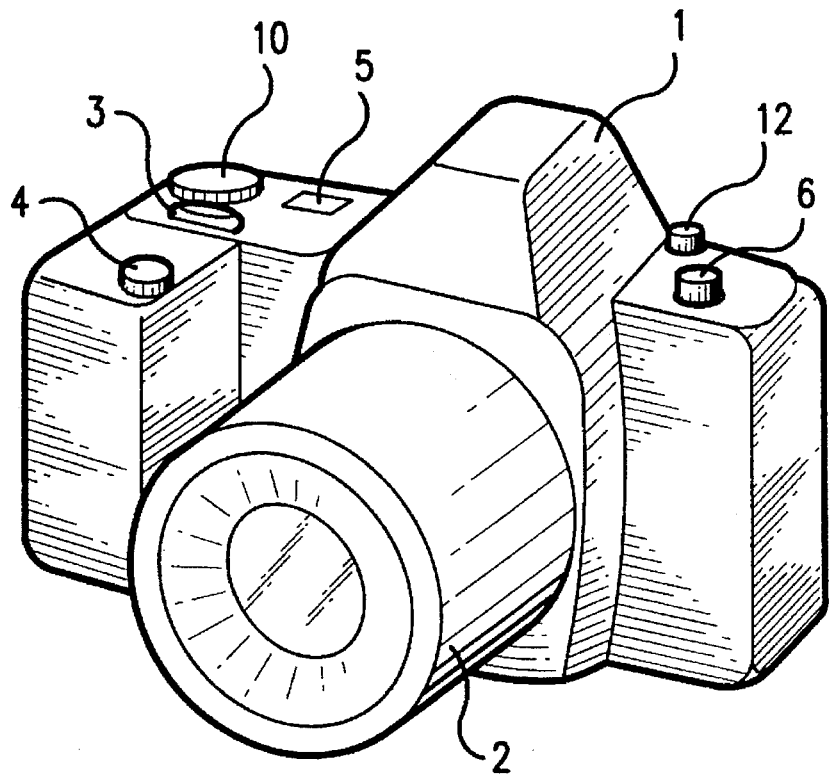
FIG. 13 is an oblique view of a camera showing the external appearance of the multiple point focus detection camera of FIG. 12.
Figure 14:
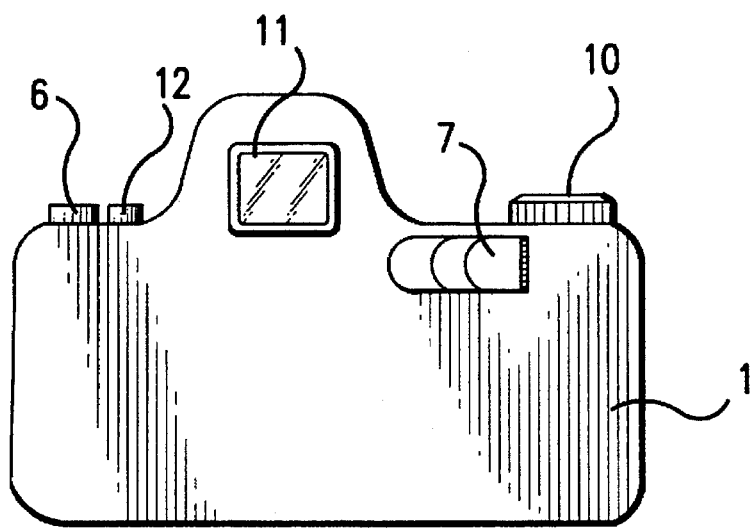
FIG. 14 is a rear view showing the external appearance of the multiple point focus detection camera of FIG. 12.

An explanation of the external appearance of a camera according to the present embodiment is provided hereafter, with reference to FIGS. 13 and 14.

A power switch 3, release button 4, mode display 5, self timer setting button 12, mode change button 6 and command dial 10 are mounted on the top of a camera body 1. Furthermore, the viewfinder eyepiece window 11 and the area selection lever 7 are provided on the back surface of the camera body 1.

Figure 15:
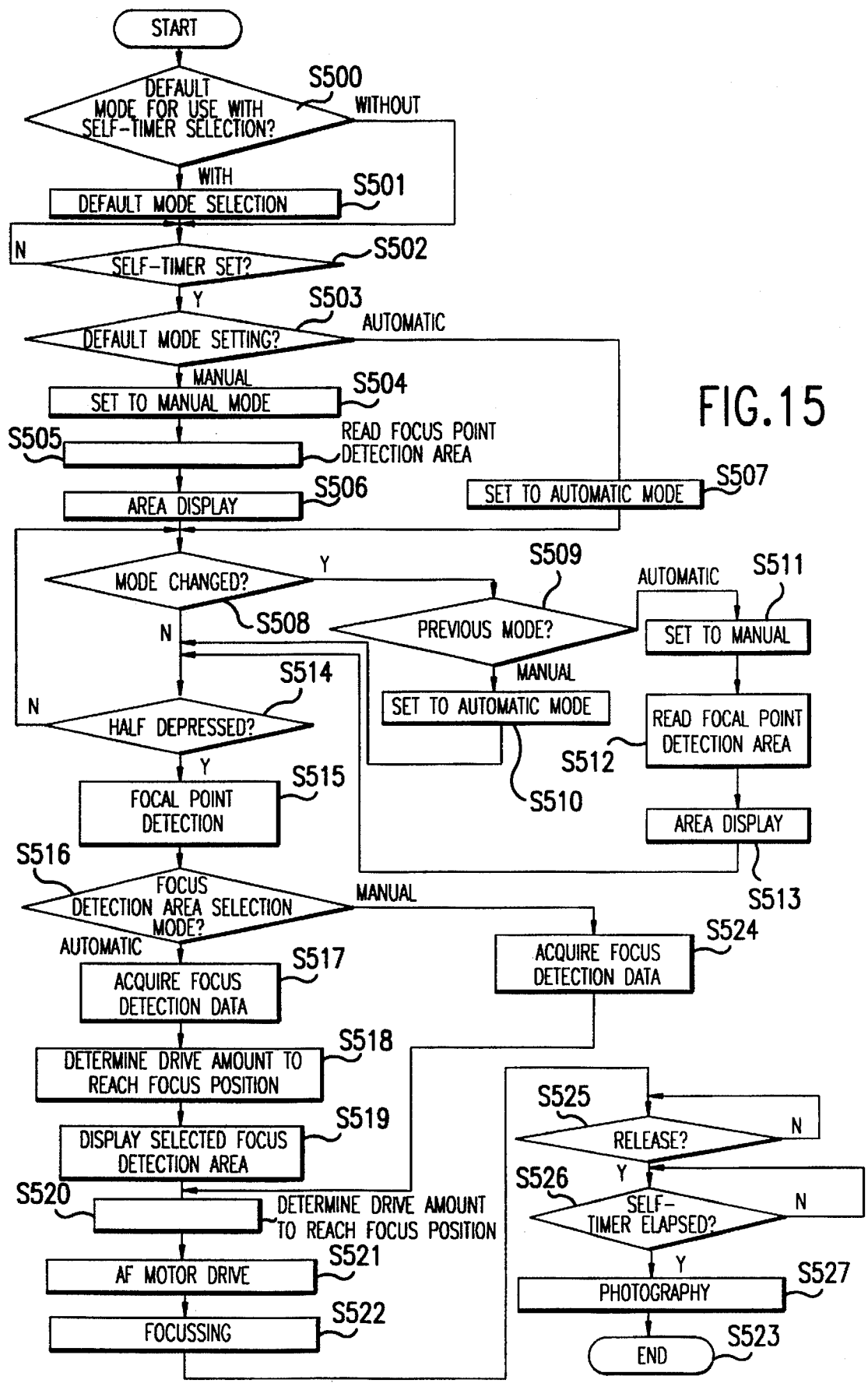
FIG. 15 is a flow chart showing the operation of the multiple point focus detection camera of FIG. 12.

A further explanation of the operation of the camera according to the present embodiment is provided hereafter, with reference to FIG. 15.

First, when the power switch 3 is turned on by the photographer, the computer in the CPU 541 reads the program stored in memory 545 and initiates operations following the program. First, in step S500, the CPU 541 proceeds to step S501 when the self timer setting button 12 and the command dial 10 are operated simultaneously. In step S501, the CPU 541 stores in memory 547 the mode set by the self timer setting button 12 and the command dial 10. By operating the command dial 10 while depressing the self timer setting button 12, the photographer can select between the automatic mode and the manual mode. If the manual mode is selected, the central area 558c shown in FIG. 16E is set, and focus detection is carried out in this area. In addition, for the automatic mode, there are three automatic modes as shown in FIG. 16B–D, one of which can be selected through the operations mentioned above. Selection of the first automatic mode is desirable when the subject is toward the left side of the field of vision 9 of the viewfinder, so that focus detection control is performed by selecting the three areas 558a, 558b and 558c shown in FIG. 16B. In addition, selection of the second automatic mode is desirable when the subject is positioned in the center of the field of vision 9 of the viewfinder, so that the three areas 558b, 558c and 558d shown in FIG. 16C are selected. In addition, selection of the third automatic mode is desirable when the subject is toward the right side of the field of vision 9 of the viewfinder, so that focus detection control is performed by selecting the three areas 558c, 558d and 558e shown in FIG. 16D.

When photography using the self timer is undertaken, the default mode is selected for photography. When the self timer setting button 12 and the command dial 10 are not operated simultaneously in step S500, the CPU 541 proceeds to step S502. In step S502, the CPU 541 waits for the self timer setting button 12 to receive the command for photography using the self timer. When the CPU 541 has received the command for photography using the self timer, it proceeds to step S503 and reads the default mode stored in memory 547. When the mode read is the automatic mode, the CPU 541 stores one of the three modes from among the first, second and third automatic modes in memory 546, stores one combination of areas matching one of the FIGS. 16B–16D as the focus detection areas of that mode (step S507) and then advances to step S508. When the mode read is the manual mode, the CPU 541 stores the manual mode in memory 546, and stores the area 158c shown in FIG. 16E as the initial focus detection area for the manual mode (step S504). When the focus detection area is changed, CPU 541 reads the focus detection area selected using the focus detection area selection lever 7, stores it in memory 546 (step S505), displays the focus detection area read on the focus detection area display 543 (step S506), and then advances to step S508. By this means, the mode that will be used during photography with the self timer can be set. Because the selected area is displayed in step S506, the photographer can select the desired area while looking through the viewfinder eyepiece window 11 and verifying the display of the selected focus detection area 558a or the like as shown on the focus detection area display 543 in the field of vision of the viewfinder.

When the CPU 541 determines in step S508 that the mode change button 6 has been operated, it first reads the mode stored in memory 146 (step S509), which, when in the automatic mode, changes the mode in memory 546 to the manual mode (step S511). Thereafter CPU 541 reads the focus detection area selected by the focus detection area selection lever 7 and stores it in memory 546 (step S512), displays the focus detection area read on the focus detection area display 543 (step S513), and then advances to step S514. In addition, when the mode stored in memory 546 is the manual mode as in step S509, the CPU 541 changes it to the automatic mode (step S510) and advances to step S514. Thus, the mode to be used during photography using the self timer is changed from the default mode to the mode set by the photographer. In addition, when the CPU determines in step S508 that the mode change button 6 has not been operated, it advances directly to step S514.

In step S514, the CPU 541 determines whether a release button half-depression signal has been sent from the release button 4, in which case, the CPU advances to step S515. On the other hand, if the half-depression signal has not been sent, the CPU returns to step S508 and receives mode changes until the release button half-depression signal is received.

When the release button half-depression signal has been sent in step S514, the CPU 541 commands the AF sensor 537 to perform focus detection via the focus detection data selector 542. In other words, in step S515, because light that has passed through the focussing lens system 31 has had its direction changed and is guided to the AF sensor 537, the AF sensor 537 uses this light to perform focus detection on the subject corresponding to focus detection areas 558a–558c, and sends the amount of discrepancy between the focus of the focussing lens system 31 and the subject (focus detection data) to the focus detection data selector 542.

In step S516, the CPU 541 requests the focus detection data selector 542 to send the necessary focus detection data. At this time, the CPU 541 reads the mode stored in memory 546, which when the automatic mode, requires the focus detection data from the three focus detection areas 558a–558c to be output to the CPU 541. In addition, when the mode stored in memory 546 is the manual mode, the CPU directs only the focus detection data from the area stored in memory 546 from among the three focus detection areas 558a–558c to be sent to the CPU 541. The focus detection data selector 542 selects the necessary focus detection data and sends it to the CPU 541, where it is received (steps S517, S524).

In the automatic mode, using a commonly known algorithm, the CPU 541 processes the focus detection data from the three focus detection areas 558a–558c received in step S517, determines in which of these three areas, 558a etc., the primary subject is located, and determines the area on which to focus (step S518). After determining the area, the CPU 541 sends a signal to the focus detection area display 543 and displays the determined focus detection area (for instance, focus detection area 558a) to distinguish it from the other areas (step S519).

The CPU 541 selectively uses the focus detection data from the selected focus detection area 558a to first compute the driving force needed and then to drive the AF motor 39 in accordance with the amount of movement of the focussing lens system 31 needed in order to focus the focussing lens system 31. Furthermore, this drive amount is sent to the AF motor controller 40, and driving is commanded (step S520).

The CPU 541 focusses the focussing lens system 31 by driving the AF motor 39 via the AF motor controller 40 (steps S521, S522). The AF motor controller 40 drives the AF motor 39 a certain amount based on the signal from the CPU 541 indicating the drive amount. This driving force is transmitted to the gears 32 inside the lens via the gears 38 inside the camera and the couplings 34 and 33. Focussing is completed when the focussing lens system 31 has been moved to the focussing position.

The CPU 541 waits until a release complete depression signal is sent from the release button 4 (step S525). When the release complete depression signal has been sent, the CPU 541 measures a certain time interval set beforehand, after the passage of which (step S526) it directs photography to occur, causing a photograph to be taken (step S527). After this, photography using the self timer is completed.

When the manual mode is used, the CPU 541 advances to step S520 because data from focus detection area 558a, which has been selected by the focus detection area selection lever 7, has been sent to the focus detection data selector 542 in step S524, the CPU then computes the drive amount for the AF motor 39 using the focus detection data and sends it as a signal to the AF motor controller 40.

As described above, with the camera of the present embodiment, during photography using the self timer, photography is performed using a default mode set beforehand, regardless of the mode in use immediately prior to picture taking.

When the manual mode is set as the default, it is possible to focus with certainty on the primary subject because the area verified by the photographer as containing the primary subject is selected as the selected area by operation of the focus detection area selection lever 7. Accordingly, it is possible to take pictures with the focus made certain on the primary subject in commemorative photographs and the like that cannot be retaken later. In addition, operability is good because it is not necessary to verify which of the modes, either automatic or manual, has been in use immediately prior to this photograph, or to switch modes manually.

In addition, when an automatic mode is set as the default, it becomes possible to take photographs in which the focus is on the primary subject in most cases to the extent that no special composition is desired, even when the photographer is a novice who is not accustomed to focus detection area selection using the manual mode. Accordingly, the possibility of errors during picture taking is reduced, and it is possible to take with certainty commemorative photographs and the like in which a self timer is often used and which generally cannot be retaken later. In addition, operability is good because it is not necessary to verify which of the modes, either automatic or manual, has been in use immediately prior to the photograph, or to switch it manually.

In this way, because there are different benefits to either setting the manual mode or the automatic mode as the default for use during photography with the self timer, it becomes possible to provide a multiple point focus detection camera for a wide range of users with the present embodiment, which allows the default to be set by the photographer according to the desires of the photographer.

Furthermore, although the selected mode is set as a default, it is possible to change the default mode when desired by operation of the change button 6; therefore, it is never necessary to take a picture using a mode that is not desired by the photographer.

With the embodiment described above, the structure is such that the mode set as the default for photography using the self timer can be pre-set by the photographer, but it is naturally also possible to have a structure in which either the manual mode or the automatic mode is permanently set beforehand. With this kind of structure, either the automatic mode or the manual mode would be set beforehand in accordance with the particular group targeted as users for the multiple point focus detection camera. For instance, when the targeted users are novices, the automatic mode could be pre-stored in memory 547. When the users targeted are professionals or advanced amateurs, the manual mode could be pre-stored in memory 547.

Figure 17:
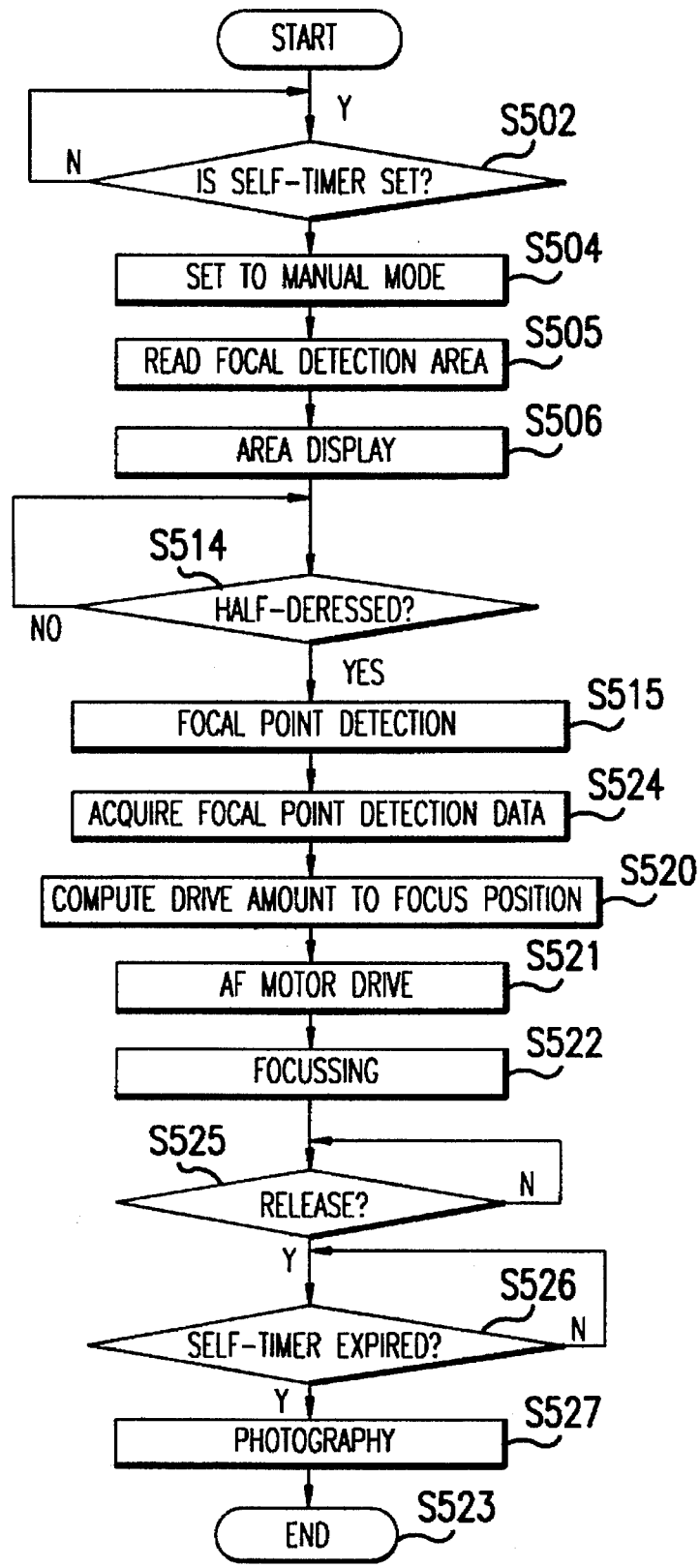
FIG. 17 is a flow chart showing the operation of a multiple point focus detection camera according to another embodiment of the present invention.

An explanation of the operation of a multiple point focus detection camera in which the manual mode has been rigidly set as the default mode for photography using a self timer is provided hereafter, with reference to FIG. 17. In this case, the manual mode is stored in memory 547 beforehand as the default mode for photography using a self timer. In addition, area 558c shown in FIG. 16E is stored in memory 547 as the initial focus detection area. Accordingly, it is unnecessary for the photographer to set the default mode in the manner described in the above embodiment.

Accordingly, as shown in FIG. 17, the CPU 541 waits until the self timer setting button 12 receives the command for photography using the self timer (step S502), and when it has received the command for photography using the self timer, the CPU advances to step S504 and stores the area 558c shown in FIG. 16E in memory 546 as the initial focus detection area for the manual mode, and when the focus detection area is changed by the operation of the focus detection area selection lever 7, this is stored in memory 546 (step S505), and the focus detection area read is displayed on the focus detection area display 543 (step S506).

Furthermore, in the following step S514, the CPU 541 waits until a release half-depression signal is sent from the release button 4. When the release half-depression signal is sent, the CPU advances to steps S515–S522, commands the performance of focus detection, acquires focus detection data and moves the lens to the focussing position. Furthermore, the CPU waits for a release complete depression signal to be sent from the release button 4. When the release complete depression signal is sent, it measures a certain time interval set beforehand, upon the passage of which, photography is directed and a photograph is taken (steps S520–S527). In this way photography using the self timer is completed.

With the present invention, the controller operates in the detection mode (automatic or manual detection mode) set by the photographer except when a forcible detection mode signal (i.e., a default mode) is received by the controller. The forcible detection mode signal can be output when: the power button is pressed, when the lens is switched, based upon lens data that is read from the mounted lens, when the MF switch is actuated, or when the self timer is used, for example.

When the controller receives the forcible detection mode signal, the controller operates in a default mode, which can be the manual or automatic detection mode. As detailed above, the default mode can be set (as either the manual or automatic detection mode) by the photographer or by the manufacturer of the camera.

While this invention has been described in conjunction with specific embodiments thereof, it is evident that many alternatives, modifications and variations will be apparent to those skilled in the art. For example, buttons, switches and dials other than those shown can be used to select between the various modes and settings. Additionally, the type of automatic and manual focusing procedures that can be used with the invention can vary from those specifically described. The routines can be performed by one or more microcomputers, or by a hard-wired system and/or circuit, for example. Accordingly, the preferred embodiments of the invention as set forth herein are intended to be illustrative, not limiting. Various changes may be made without departing from the spirit and scope of the invention as defined in the following claims.

What is claimed is:

1. A multiple point focus detection camera capable of acquiring focus detection data in a manual detection mode and in an automatic detection mode from a plurality of focus detection areas comprising:

mode setting means for enabling a photographer to set said manual detection mode or said automatic detection mode;

control means for acquiring focus detection data from a specific focus detection area selected by the photographer from among said plurality of focus detection areas when operating in said manual detection mode, and for acquiring a plurality of focus detection data from said plurality of focus detection areas when operating in said automatic detection mode and automatically determining a specific focus detection area from said plurality of focus detection data;

said control means operating in the detection mode set by said mode setting means except when a forcible detection mode signal is received by said control means, said control means operating in a default mode when said forcible detection mode signal is received, said default mode being one of said manual detection mode or said automatic detection mode.

2. The camera as in claim 1, wherein said default mode is said automatic detection mode.

3. The camera as in claim 1, wherein said default mode is said manual detection mode.

4. The camera as in claim 1, further comprising default mode setting means for enabling the photographer to set the default mode as one of said manual mode and said automatic mode.

5. The camera as in claim 1, further comprising:

power source detection means for detecting when a power source of said camera is engaged, said power source detection means outputting said forcible detection mode signal to said control means when said power source is engaged, said default mode being said automatic detection mode.

6. The camera as in claim 5, further comprising:

mode change receiving means for receiving a command to switch from said automatic detection mode to said manual detection mode from the photographer;

said control means switching to said manual detection mode upon reception of said command by said mode change receiving means when operating in said default mode.

7. The camera as in claim 5, further comprising:

lens mounting detection means for detecting when a lens is being mounted to said camera;

said lens mounting detection means outputting said forcible detection mode signal to said control means when lens mounting is detected, said default mode being said automatic detection mode.

8. The camera as in claim 7, further comprising:

lens data reading means for reading lens data from said mounted lens, said lens data indicating characteristics of said mounted lens; and said lens data reading means further comprising means for identifying specific lens data in said lens data, said control means not operating in said default mode when said specific lens data is identified by said lens data reading means.

9. The camera as in claim 1, further comprising:

lens mounting detection means for detecting when a lens is being mounted to said camera;

said lens mounting detection means outputting said forcible detection mode signal to said control means when lens mounting is detected, said default mode being said automatic detection mode.

10. The camera as in claim 9, further comprising:

mode change receiving means for receiving a command to switch from said automatic detection mode to said manual detection mode from the photographer;

said control means switching to said manual detection mode upon reception of said command by said mode change receiving means when operating in said default mode.

11. The camera as in claim 1, further comprising:

lens data reading means for reading lens data from a mounted lens on said camera, said lens data indicating characteristics of said mounted lens; and said lens data reading means further comprising means for identifying specific lens data in said lens data, said control means operating in said default mode, which is said automatic detection mode, when said lens data does not include said specific lens data.

12. The camera as in claim 11, further comprising:

mode change receiving means for receiving a command to switch from said automatic detection mode to said manual detection mode from the photographer;

said control means switching to said manual detection mode upon reception of said command by said mode change receiving means when operating in said default mode.

13. The camera as in claim 1, further comprising:

focus mode selection means for enabling the photographer to select between an auto focus mode in which a lens of the camera is automatically driven and focussed, and a manual focus mode in which the photographer must focus the lens, said focus mode selection means outputting said forcible detection mode signal when said manual focus mode is selected;

said default mode being said automatic detection mode.

14. The camera as in claim 1, further comprising:

self timer receiving means for receiving a command to operate said camera using self timing, said self timer receiving means outputting said forcible detection mode signal to said control means when said self timing is selected so that said camera operates in said default mode during said self timing.

15. The camera as in claim 14, further comprising:

mode selection means for enabling the photographer to select said manual detection mode or said automatic detection mode as said default mode.

16. The camera as in claim 14, wherein said default mode is said manual detection mode.

17. The camera as in claim 16, wherein said specific focus detection area is a focus detection area positioned in a center of said plurality of focus detection areas when said manual detection mode is selected.

18. The camera as in claim 14, wherein said default mode is said automatic detection mode.

19. The camera as in claim 18, wherein:

said specific focus detection area is computed by acquiring said focus detection data from a number of said focus detection areas, said number being smaller than a total number of said plurality of focus detection areas.

20. A multiple point focus detection camera capable of acquiring focus detection data in a manual detection mode and in an automatic detection mode from a plurality of focus detection areas comprising;

a mode change selector member for enabling a photographer to set said manual detection mode or said automatic detection mode;

a first central processing unit for acquiring focus detection data from a specific focus detection area selected by the photographer from among said plurality of focus detection areas when operating in said manual detection mode, and for acquiring a plurality of focus detection data from said plurality of focus detection areas when operating in said automatic detection mode and automatically determining a specific focus detection area from said plurality of focus detection data;

said first central processing unit operating in the detection mode set by said mode change selector member except when a forcible detection mode signal is received by said first central processing unit, said first central processing unit operating in a default mode when said forcible detection mode signal is received, said default mode being one of said manual detection mode or said automatic detection mode.

21. The camera as in claim 20, wherein said default mode is said automatic detection mode.

22. The camera as in claim 20, wherein said default mode is said manual detection mode.

23. The camera as in claim 20, further comprising a self-timing selector member and a default mode selector member for enabling the photographer to set the default mode as one of said manual mode and said automatic mode.

24. The camera as in claim 20, further comprising:

a power switch detector for detecting when a power source of said camera is engaged, said power switch detector outputting said forcible detection mode signal to said first central processing unit when said power source is engaged, said default mode being said automatic detection mode.

25. The camera as in claim 24, further comprising:

a lens mounting detector member for detecting when a lens is being mounted to said camera;

said lens mounting detector member outputting said forcible detection mode signal to said first central processing unit when lens mounting is detected, said default mode being said automatic detection mode.

26. The camera as in claim 25, further comprising:

a second central processing unit for reading lens data from said mounted lens, said lens data indicating characteristics of said mounted lens; and said second central processing unit further identifying specific lens data in said lens data, said first central processing unit not operating in said default mode when said specific lens data is identified by said second central processing unit.

27. The camera as in claim 20, further comprising:

a lens mounting detector member for detecting when a lens is being mounted to said camera;

said lens mounting detector member outputting said forcible detection mode signal to said first central processing unit when lens mounting is detected, said default mode being said automatic detection mode.

28. A method of acquiring focus detection data from a plurality of focus detection areas while operating a camera in a manual or automatic detection mode, said focus detection data being acquired from a specific focus detection area from among said plurality of focus detection areas when in said manual detection mode, and from said plurality of focus detection areas when in said automatic detection mode, said method comprising the steps of:

manually setting said camera to said manual detection mode or to said automatic detection mode;

operating said camera in the set detection mode except when a forcible detection mode signal is received; and operating said camera in a default mode when said forcible detection mode signal is received, said default mode being one of said manual detection mode or said automatic detection mode.

29. The method of claim 28 further comprising outputting said forcible detection mode signal when a power source of said camera is engaged, and wherein said default mode is said automatic detection mode.

30. The method of claim 28 further comprising outputting said forcible detection mode signal when a lens is mounted to said camera, and wherein said default mode is said automatic detection mode.

31. The method of claim 30 further comprising the steps of:

reading lens data from said lens;

and operating said camera in said default mode unless specific lens data is read.

32. The method of claim 29 further comprising the steps of:

reading lens data from a lens mounted to said camera; and operating said camera in said default mode unless specific lens data is read.

33. The method of claim 28 further comprising outputting said forcible detection mode signal when a self timer mode of said camera is engaged.

34. The method of claim 33 wherein a user of said camera determines said default mode.

35. The method of claim 33 wherein a manufacturer of said camera determines said default mode.

* * * * *